UNITED STATES PATENT OFFICE.

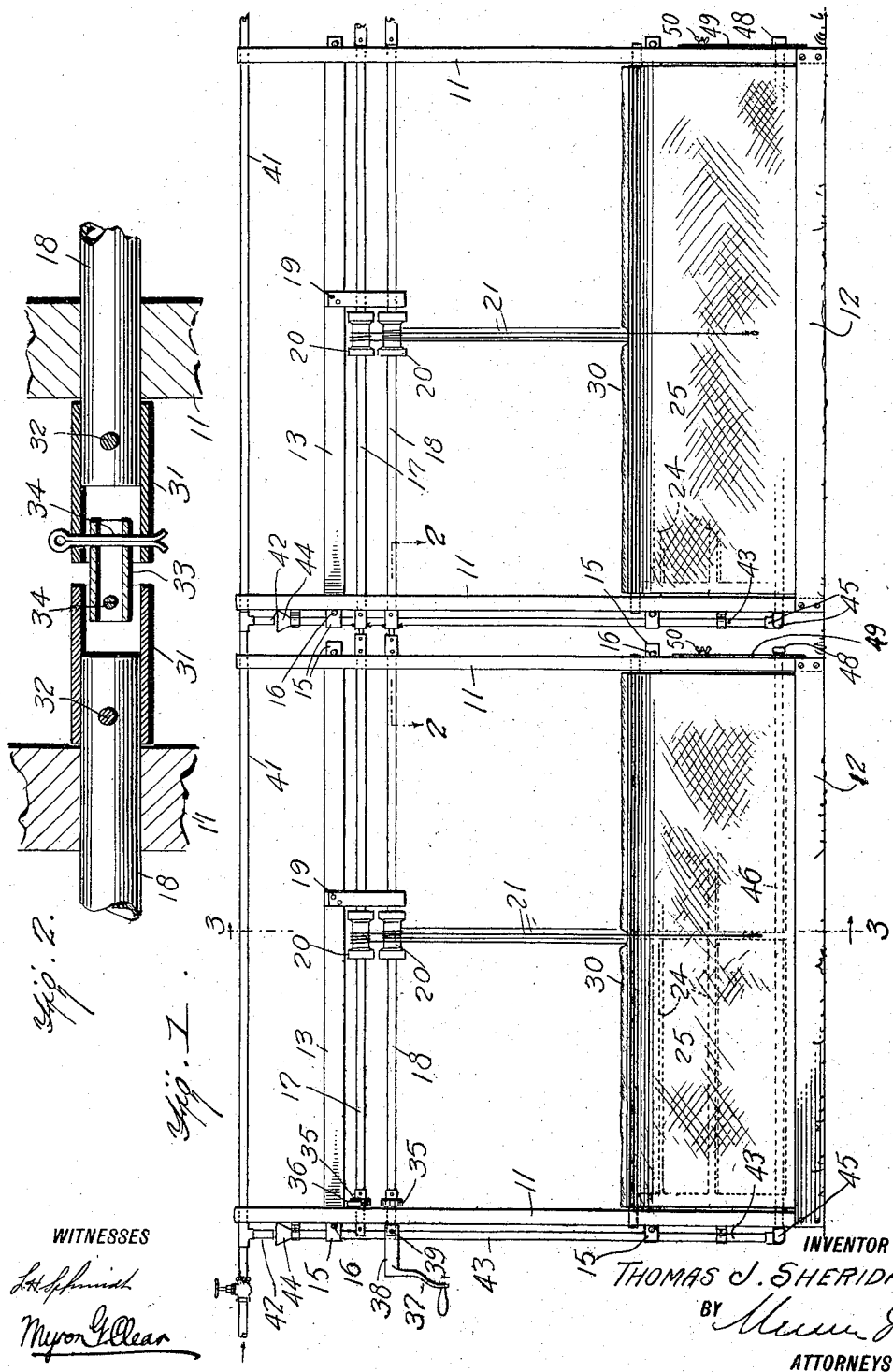

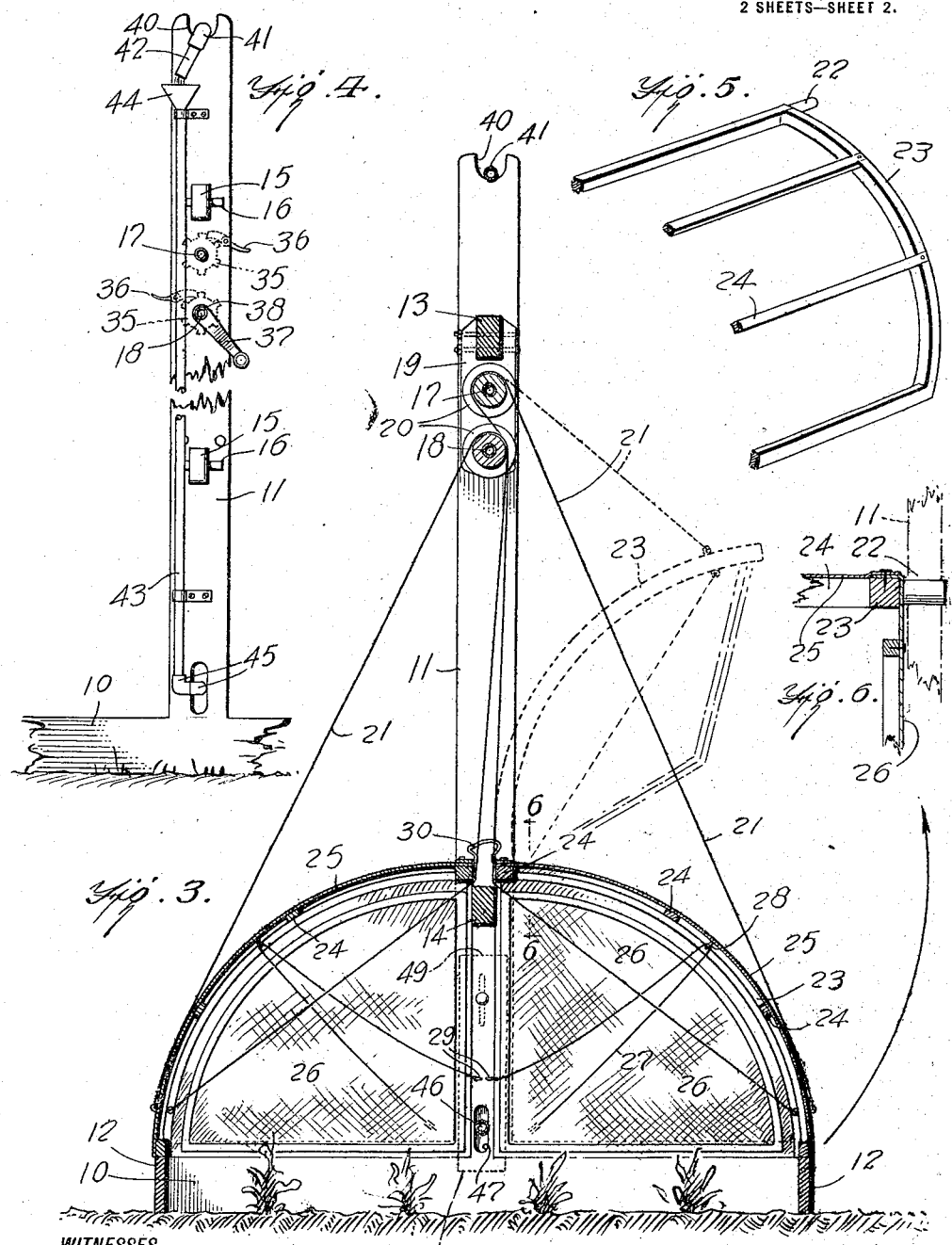

THOMAS JOSEPH SHERIDAN, OF CHARLESTON, SOUTH CAROLINA.

PLANT PROTECTOR AND IRRIGATOR.

1,218,326.    Specification of Letters Patent.    Patented Mar. 6, 1917.

Application filed October 28, 1916. Serial No. 128,172.

*To all whom it may concern:*

Be it known that I, THOMAS J. SHERIDAN, a citizen of the United States, and a resident of Charleston, in the county of Charleston and State of South Carolina, have invented a certain new and useful Improvement in Plant Protectors and Irrigators, of which the following is a specification.

My present invention relates generally to plant protecting devices, and more particularly to a plant protector having provision for irrigating the plants protected thereby, my object being to provide a series of plant protecting frames including water and snow shedding wings capable of rising and lowering to more or less cover the plants, and having operating devices for the wings of such nature as that the frames may be coupled in a series for simultaneous operation of the wings throughout the series.

A further object of my invention is to provide means whereby the wings of the several frames of the series may be held in various degrees of elevation, and a still further object is to provide supporting frames for the protecting wings of such nature that they may be tilted to one side of the row or rows of plants protected thereby, to admit of plowing or otherwise working the soil normally covered by the frame.

A still further object of my invention is to provide irrigating means partly supported and partly carried by the frames, and of such nature as that the water may be discharged onto the ground without material pressure, even though connected to a pressure supply, so as to obviate washing out seeds, small plants, and the like.

Further objects of my invention, residing as they do for the most part in the details of construction of the various parts, will be apparent from the following description thereof, in which reference is made to the accompanying drawings forming a part of this specification and wherein—

Figure 1 is a side elevation illustrating two complete frames of a series coupled together for simultaneous control and operation;

Fig. 2 is a horizontal sectional view taken on the line 2—2 of Fig. 1 and enlarged;

Fig. 3 is a vertical section taken substantially on line 3—3 of Fig. 1;

Fig. 4 is an elevation of one of the frame end pieces;

Fig. 5 is a sectional perspective view of one end of one of the wing frames, and Fig. 6 is a detail vertical section, taken substantially on line 6—6 of Fig. 3.

Referring now to these figures, and particularly to Fig. 1, I have shown two complete frames coupled together, as the frames are capable of being coupled in a series, and each frame of which includes end portions having lower horizontal cross bars 10 and central uprights 11 rising from the said cross bars, the ends of the cross bars 10 of each frame being connected by side bars 12, and the uprights 11 thereof being connected by longitudinal tie bars 13 and 14, the former of which is arranged some distance above the latter.

Each of the tie bars 13 and 14 is provided with reduced end tenons 15 extending through conformable apertures in the uprights 11, and provided with transverse openings for the reception of cross pins 16 by means of which the uprights 11, and consequently the end frames, are locked in their spaced apart relation.

The uprights 11 of each frame are also provided with upper and lower openings, below the upper tie bar 13, forming bearings for vertically spaced parallel shafts 17 and 18, each of which projects at its ends beyond the uprights, and is provided with a transverse opening adjacent its extremity. Each of these shafts extends through a bearing 19, intermediate the uprights 11, secured to and depending from the upper tie bar 13, as particularly seen in Fig. 3, and each shaft is further provided with a winding drum 20 around which a flexible control connection 21 is given several turns intermediate its ends.

At laterally spaced points slightly above the lower tie bar 14 the uprights 11 of each frame are provided with openings forming bearings for the end tenons 22 of the wings, which curve outwardly and downwardly and rest at their lower edges in their lowermost closed position upon the side bars 12, as seen in Fig. 3, each wing being curved substantially in the arc of a circle and extending between the uprights 11.

Each of the wings consists of a frame comprising curved end rails 23 connected at spaced points by longitudinal strips 24, the upper inner strips of which are preferably extended beyond the end rails 23 and reduced to form tenons 22. Over the end rails 22 of the several longitudinal strips is fastened a covering 25, preferably of canvas, duck, or similar material, which is made to conform, of course, to the frame of the wing and which, due to the shape thereof, is capable of shedding snow and ice which might otherwise tend to cause its collapse.

Each frame thus carries two laterally extending wings each of which is capable of elevation, swinging on its upper inner tenons 22 to a more or less elevated position so as to more or less cover the space inclosed by the frame, and each of which is controlled from one of the shafts 17 and 18 by virtue of the connection, as particularly seen in Fig. 3, of the ends of the flexible connection 21, to the inner and outer points thereof adjacent its lower outer longitudinal strip 24.

Each wing has a framed flexible end flap 26 flexibly attached to each end strip and to each flap 26 is secured one end of a flexible connection 27 passing at an intermediate point through an eye 28 carried by its respective wing and attached at the opposite end thereof, at 29, to the adjacent upright 11, as seen in Fig. 3, so that the end flap, normally extending in a vertical position, as shown in that figure, is caused to swing inwardly of the wing when the latter is raised.

The two laterally projecting wings of each frame are connected at their upper ends by a flexible strip 30, which spans the space between the upper ends of the wings without interfering with the vertical adjustment thereof.

A plurality of frames, each of which is constructed as now described, may be arranged in substantially longitudinal alinement, and by connecting shafts 17 and 18 of the successive frames the wings of the entire series may be raised and lowered at the same time.

In order to do this, a special coupling for the adjacent shaft ends is utilized, as seen particularly in Figs. 1 and 2, being composed of tubular connecting members 31 in spaced relation, receiving the extremities of the adjacent shafts, and connected thereto by pins 32 passing through the apertures of the shaft extremities, as before mentioned, the adjacent ends of the connecting members 31 receiving a tubular coupling member 33 axially thereof, and of materially reduced diameter as compared thereto, the coupling member so disposed being connected to the said connecting members 31 by means of transverse pins 34 which, as seen particularly in Fig. 2, extend at right angles to one another so that the shafts 17 and 18 of successive frames are not only connected but are connected in such manner that the frames may be seated in a series upon irregular ground and thus in more or less disalinement, and the shafts 17 and 18 thereof still rotated simultaneously with one another.

The shafts 17 and 18 are further provided with ratchet wheels 35 adjacent one of the uprights 11 for engagement by pawls 36 connected to the upright, so that the wings may be locked in various degrees of vertical adjustment, and a crank 37 having a tubular extension 38 to receive the extremity of each of the shafts being utilized, to effect rotation of the shaft, and adapted for connection thereto by a pin 39 for extension through the end aperture of the shaft. The upper end of each of the uprights 11 is provided with a recess 40 in which a service pipe 41 may be received, this pipe to extend the length of the series of plant protecting frames, and being in accordance with my invention, provided with a discharge nipple extending downwardly at an angle and adjacent one end of each frame, as indicated at 42.

The corresponding end of each frame is provided with an upright pipe 43 having an enlarged funnel-shaped upper end 44 into which water is discharged from the nipple 42, the lower end of the upright pipe 43 being connected by elbows 45 to a horizontal discharge pipe 46 extending centrally and longitudinally through the frame and through vertical slotted openings 47 in the uprights 11 of the frame adjacent the lower ends of the latter.

The elbows 45 connecting the upright pipe 43 of each frame with the horizontal discharge pipe 46, as seen best in Figs. 1 and 4, forms a joint upon which the horizontal pipe 46 may be raised and lowered, its free closed end 48 being extended for this purpose through an adjusting plate 49 disposed upon the outer surface of one of the uprights 11, as seen in Fig. 1, and having an upper longitudinal slot through which a clamping bolt 50 operates to clamp the plate 49 in selected vertical position. The horizontal pipes 46 are, of course, apertured, preferably slitted, to discharge the water upon the surface of the ground inclosed by the frame, the water so discharged being under pressure of the head of water within the upright pipe 43 only in view of the reception of the water by the upright pipes from the discharge nipples 42 of the service pipe 41. In this way all danger of washing out seed or plants is obviated.

It is apparent from the foregoing description that any number of frames such as provided by my invention, may be coupled in a series as may be practical to control from a single point, and that the frames are of such nature that the entire series or only a portion thereof may be tilted laterally at the same time, so as to uncover the ground normally covered by the frame, for plowing or cultivating.

It is obvious furthermore that my invention provides a comparatively simple and inexpensive protecting apparatus which may be utilized practically upon an extended plane, and that the wings may be adjusted and maintained in desired adjustment for all purposes, and with a minimum expenditure of labor.

I claim:—

1. A plant protector including a series of portable, laterally tiltable frames, each of which is provided with adjustable covering wings, and operating shafts connected to the wings for the manipulation of the latter, the operating shafts being extended beyond the frames, and couplings between the operating shafts of the several frames throughout the series, whereby the wings of the several frames may be simultaneously controlled and tilted, said couplings including detachable parts whereby the frame may be independently tilted.

2. A plant protector including a series of frames, each of which is provided with adjustable covering wings, and portable operating shafts connected to the wings for the manipulation of the latter, the operating shafts being extended beyond the frames, and provided with apertured extremities, and couplings connecting the said shaft extremities whereby to permit of simultaneous control of the wings of the several frames of the series, said couplings including relatively shiftable parts whereby the frames may assume various angles with respect to one another.

3. A plant protector including a series of frames, each of which is provided with adjustable covering wings, and rotatable operating shafts connected to the wings for the manipulation of the latter, the operating shafts being extended beyond the frames and provided with apertured extremities, couplings connecting the said shaft extremities whereby to permit of simultaneous control of the wings of the several frames of the series and including tubular connecting members receiving the shaft extremities and provided with pins extending through the apertures of the shaft extremities, and opposed to one another, and a coupling member extending into the opposed ends of the connecting members and having pins projecting therethrough at its opposite ends, said coupling member being of reduced diameter as compared to the diameter of the connecting members, and having its pins extending therethrough at right angles to one another, all for the purpose described.

4. In a plant protector, end frames each consisting of a horizontal cross bar and an upright extending vertically from the center of the cross bar, longitudinal tie bars connecting the uprights, side bars connecting the ends of the said cross bar, and wings extending between said end frames having upper end trunnions journaled in the uprights above the said cross bars, each of said wings consisting of a covered frame curved outwardly and downwardly in the arc of a circle, and resting in closed position upon one of the said side bars.

5. In a plant protector, end frames each consisting of a horizontal cross bar and an upright extending vertically from the center of the cross bar, longitudinal tie bars connecting the uprights, tie bars connecting the ends of the said cross bar, and wings extending between said end frames having upper end trunnions journaled in the uprights above the said cross bars, each of said wings consisting of a covered frame curved outwardly and downwardly in the arc of a circle and resting, in closed position, upon one of the said tie bars, and means for elevating each of said wings and securing the same in selected adjustment.

6. In a plant protector, a supporting frame including end uprights intermediate the sides thereof and laterally projecting wings journaled in the uprights and extending therebetween, each of said wings including a covered frame curving outwardly and downwardly, means for adjusting said wings vertically and holding the same in elevated position, end flaps carried by the wings and movable therewith, and means for shifting said end flaps inwardly and upwardly against the wings when the latter are raised.

7. In a device of the character described, a frame including end uprights having vertically slotted openings, an adjusting plate vertically adjustable upon one of the said uprights and provided with an aperture, a discharge pipe extending horizontally between the uprights and through the slots thereof and extending also through the opening of the said adjusting plate, an upright pipe adjacent one of the frame uprights having a swivel connection at its lower end with one end of the said discharge pipe and having a funnel-shaped upper end, and a service pipe provided with a discharge nipple opening above the funnel-shaped upper end of the vertical pipe, for the purpose described.

8. In a device of the character described, the combination with a service pipe having a discharge nipple, of a supporting frame, a pipe opening at one end beneath the said discharge nipple to receive fluid therefrom, an upright discharge pipe having a movable connection with said last named pipe and mounted in the supporting frame, and connections for adjusting said last discharge pipe within the supporting frame.

THOMAS JOSEPH SHERIDAN.

Copies of this patent may be obtained for five cents each, by addressing the "Commissioner of Patents, Washington, D. C."